US010021690B2

(12) United States Patent
Richards et al.

(10) Patent No.: US 10,021,690 B2
(45) Date of Patent: Jul. 10, 2018

(54) MULTI-PATH TRANSMISSION CONTROL PROTOCOL CONNECTIONS

(71) Applicant: Telefonaktiebolaget L M Ericsson (publ), Stockholm (SE)

(72) Inventors: Christopher Richards, Ottowa (CA); Michael William Petras, Nepean (CA)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 356 days.

(21) Appl. No.: 14/423,797

(22) PCT Filed: Feb. 13, 2015

(86) PCT No.: PCT/IB2015/051092
§ 371 (c)(1),
(2) Date: Feb. 25, 2015

(87) PCT Pub. No.: WO2016/128799
PCT Pub. Date: Aug. 18, 2016

(65) Prior Publication Data
US 2016/0242180 A1    Aug. 18, 2016

(51) Int. Cl.
*H04W 72/04* (2009.01)
*H04W 4/70* (2018.01)
(Continued)

(52) U.S. Cl.
CPC ......... *H04W 72/0453* (2013.01); *H04L 69/14* (2013.01); *H04L 69/16* (2013.01);
(Continued)

(58) Field of Classification Search
CPC ....... H04L 69/14; H04L 69/16; H04L 69/324; H04L 69/325; H04L 69/326;
(Continued)

(56) References Cited

U.S. PATENT DOCUMENTS 5,894,557 A * 4/1999 Bade .................. H04L 29/06
709/228
6,272,148 B1 * 8/2001 Takagi .................. H04L 1/1858
370/469
(Continued)

FOREIGN PATENT DOCUMENTS

WO    WO 2013/040503 A2    3/2013
WO    WO 2014/111499 A1    7/2014

OTHER PUBLICATIONS

Enhancing User QoE in Multi-Carrier LTE Dense Networks via Multi-Path Support Konstantinos Samdanis, Andreas Ripke, Dirk Kutscher NEC Europe Ltd Kurffusten-Anlage 36, 69115 Heidelberg, Germany { samdanislripkelkutscher }@neclab.eu.*
(Continued)

*Primary Examiner* — Andrew Lai
*Assistant Examiner* — Andrew C Lee
(74) *Attorney, Agent, or Firm* — Sage Patent Group

(57) ABSTRACT

Systems, methods, and nodes that implement multipath TCP (MPTCP) in a communication system establish first and second data link layer connections to a remote node, notify a transport layer of the establishment of the first and second data link layer connections, and establish first and second transport layer connections with the remote node over the first and second data link layer connections. A packet received at the data link layer for transmission to the remote node is inspected to determine if MPTCP is enabled for the packet, and, in response to determining that MPTCP is enabled for the packet, the packet is assigned to one of the first data link layer connection and the second data link layer connection based on an affinity between an MPTCP subflow associated with the packet and the one of the first data link layer connection and the second data link layer connection.

14 Claims, 13 Drawing Sheets

(51) Int. Cl.

| | | |
|---|---|---|
| *H04W 76/10* | (2018.01) | |
| *H04W 76/15* | (2018.01) | |
| *H04L 29/06* | (2006.01) | |
| *H04W 76/02* | (2009.01) | |
| *H04L 29/08* | (2006.01) | |
| *H04W 4/00* | (2018.01) | |
| *H04W 80/06* | (2009.01) | |
| *H04W 80/08* | (2009.01) | |

(52) U.S. Cl.
CPC .......... *H04L 69/321* (2013.01); *H04L 69/324* (2013.01); *H04L 69/325* (2013.01); *H04L 69/326* (2013.01); *H04W 4/005* (2013.01); *H04W 4/70* (2018.02); *H04W 76/02* (2013.01); *H04W 76/025* (2013.01); *H04W 76/10* (2018.02); *H04W 76/15* (2018.02); *H04W 80/06* (2013.01); *H04W 80/085* (2013.01); *H04L 69/08* (2013.01)

(58) Field of Classification Search
CPC ............. H04W 72/0453; H04W 76/02; H04W 76/025; H04W 80/02; Y02B 60/33
See application file for complete search history.

(56) References Cited

U.S. PATENT DOCUMENTS

| 2004/0051664 | A1* | 3/2004 | Frank | G01S 5/0252 |
| | | | | 342/457 |
| 2005/0100000 | A1* | 5/2005 | Faulkner | H04L 47/10 |
| | | | | 370/352 |
| 2011/0269456 | A1* | 11/2011 | Krishnaswamy | H04W 8/26 |
| | | | | 455/426.1 |
| 2011/0296006 | A1* | 12/2011 | Krishnaswamy | H04L 45/00 |
| | | | | 709/224 |
| 2012/0093150 | A1* | 4/2012 | Kini | H04L 45/24 |
| | | | | 370/389 |
| 2013/0021968 | A1* | 1/2013 | Reznik | H04L 45/245 |
| | | | | 370/328 |
| 2013/0064198 | A1* | 3/2013 | Krishnaswamy | H04L 45/24 |
| | | | | 370/329 |
| 2013/0077501 | A1* | 3/2013 | Krishnaswamy | H04L 47/193 |
| | | | | 370/252 |
| 2013/0114481 | A1* | 5/2013 | Kim | G06F 15/16 |
| | | | | 370/310 |
| 2013/0128873 | A1* | 5/2013 | Eipe | H04W 76/02 |
| | | | | 370/338 |
| 2013/0195004 | A1* | 8/2013 | Hampel | H04L 69/16 |
| | | | | 370/315 |
| 2013/0195106 | A1* | 8/2013 | Calmon | H04B 7/15521 |
| | | | | 370/389 |
| 2014/0269289 | A1* | 9/2014 | Effros | H04L 47/38 |
| | | | | 370/231 |
| 2014/0351447 | A1* | 11/2014 | Annamalaisami | H04L 65/1069 |
| | | | | 709/227 |
| 2014/0362765 | A1* | 12/2014 | Biswas | H04W 76/026 |
| | | | | 370/328 |
| 2015/0201046 | A1* | 7/2015 | Biswas | H04L 69/321 |
| | | | | 370/329 |
| 2015/0350337 | A1* | 12/2015 | Biswas | H04L 67/142 |
| | | | | 709/228 |
| 2016/0057585 | A1* | 2/2016 | Horn | H04L 12/189 |
| | | | | 370/312 |
| 2016/0112239 | A1* | 4/2016 | Kanugovi | H04W 76/025 |
| | | | | 370/338 |
| 2016/0219588 | A1* | 7/2016 | Buddhikot | H04M 15/68 |
| 2016/0219589 | A1* | 7/2016 | Khawer | H04W 72/0453 |
| 2016/0286441 | A1* | 9/2016 | Kweon | H04W 36/0066 |

OTHER PUBLICATIONS

Bandwidth aggregation in heterogeneous wireless networks: A survey of current approaches and issues; Allen L. Ramaboli n, Olabisi E. Falowo, Anthony H. Chan Journal of Network and Computer Applications 35 (2012) 1674-1690.*

An Energy-aware Multipath-TCP-based Content Delivery Scheme in HeterogeneousWireless Networks; Shengyang Chen, Zhenhui Yuan and Gabriel-Miro Muntean, Member, IEEE,2013 IEEE Wireless Communications and Networking Conference (WCNC): NETWORKS.*

International Search Report and Written Opinion Corresponding to International Application No. PCT/IB2015/051092; dated Oct. 5, 2015; 12 Pages.

Samdanis et al. "Enhancing User QoE in Multi-Carrier LTE Dense Networks via Multi-Path Support", Dec. 16, 2014, http://www.researchgate.net/profile/K_Samdanis/publication/265166319_Enhancing_User_QoE_in_Multi-Carrier_LTE_Dense_Networks_via_Multi-Path_Support/links/549029320cf2d1800d8645be.pdf?inViewer=true&disableCoverPage=true&origin=publication_detail.

Deng et al. "Use-cases and Requirements for MPTCP Proxy in ISP Networks", MPTCP Working Group, Oct. 24, 2014.

Ford et al.: "TCP Extensions for Multipath Operation with Multiple Addresses" Internet Engineering Task Force (IETF) Request for Comments: 6824, Category: Experimental, ISSN: 2070-1721; Jan. 2003; 64 pages. Retrieved from the Internet from: http://www.rfc-base.org/txt/rfc-6824.txt.

* cited by examiner

MULTI-PATH TRANSMISSION CONTROL PROTOCOL CONNECTIONS

CROSS REFERENCE TO RELATED APPLICATION

This application is a 35 U.S.C. § 371 national stage application of PCT International Application No. PCT/IB2015/051092, filed in the English language on 13 Feb. 2015, the disclosure and content of which is incorporated by reference herein in its entirety.

TECHNICAL FIELD

Embodiments described herein relate generally to communication systems and, more particularly, to communication systems that support Multipath Transmission Control Protocol (MPTCP) communications.

BACKGROUND

In a typical cellular radio system, mobile terminals (also referred to as user equipment, UEs, wireless terminals, and/or mobile stations) may communicate via a radio access network (RAN) with one or more core networks, which may provide access to data networks, such as the Internet, and/or to the public-switched telecommunications network (PSTN). A RAN covers a geographical area that is divided into cell areas, with each cell area being served by a radio base station (also referred to as a base station, a RAN node, a "NodeB", and/or an enhanced NodeB or "eNodeB"). A cell area is a geographical area over which radio coverage is provided by the base station equipment at a base station site. The base stations communicate through radio communication channels with wireless terminals within range of the base stations.

Cellular communications system operators have begun offering mobile broadband data services based on, for example, WCDMA (Wideband Code-Division Multiple Access), HSPA (High-Speed Packet Access), and Long Term Evolution (LTE) wireless technologies. Fueled by the introduction of new devices designed for data applications, end user performance requirements continue to increase. Accordingly, techniques that allow cellular operators to manage data traffic more efficiently are desired.

To improve throughput in wireless communication systems, the Internet Engineering Task Force (IETF) has begun work on a Multipath Transmission Control Protocol (MPTCP) specification that is directed to extending the TCP protocol to provide the ability to simultaneously use multiple paths between user nodes (peers). MPTCP may be particularly useful in the context of Fixed Mobile Convergence (FMC), which enables a mobile terminal or other communication node to switch from mobile wireless connectivity to a mobile service provider network to fixed connectivity through a fixed access device that is within the range of the mobile terminal. The fixed access device may be located in a residence, business, or other location and may include a residential/business gateway that has a broadband connection to the Internet and provides a radio link to the mobile terminal (e.g., Wi-Fi wireless access point). Rather than switching exclusively from mobile wireless connectivity through a mobile service provider to fixed wireless connectivity through a fixed access point, MPTCP enables a mobile device to maintain simultaneous connections through both types of connections.

FIG. 1 illustrates a conventional network system 100 that facilitates communications between a source node 130 and a destination node 140 using MPTCP connectivity. The system 100 includes a broadband network Gateway (BNG) 125, a Radio Access Network (RAN) 105, a packet data network Gateway (PDN GW) 110, a broadband packet data network 120 (e.g., the Internet), and can include other network elements. In the example system 100, end nodes, such as the source node 130, can establish a radio link to the RAN 105 using one or more wireless communication protocols, such as the aforementioned WCDMA or LTE protocols, to communicate data packets through the PDN GW 110 and the packet data network 120 to other nodes, such as the destination node 140. The source node 130 can also establish a radio link to the BNG 125 using, for example, Wi-Fi (e.g., IEEE 802.11) or WiMAX, to communicate data packets through the BNG 125 and the packet data network 120.

The PDN GW 110 provides packet data connectivity between the node 130 and the packet data network 120, and serves as an anchor for node mobility between 3GPP and non-3GPP radio connections. The PDN GW 110 can perform policy enforcement, packet filtering, and/or charging support for all traffic flowing from/to the node 130. The PDN GW 110 assigns a home Internet Protocol (IP) address (e.g., IPv6 address) to the node 130, which is included in the header of data packets sent from/to the node 130.

Using MPTCP, a single TCP interface is presented to applications at the source node 130, while data is actually sent to the destination node 140 over multiple IP flows, illustrated as dashed lines in FIG. 1. That is, the source node 130 can selectively route data packet traffic through the PDN GW 110 and the packet data network 120 (e.g., illustrated as IP flow 1) to the destination of 140 or, alternatively, route data packet traffic through the BNG 125 and the packet data network 120 to the destination of 140 while bypassing the PDN GW 110 (e.g., illustrated as IP flow 2). This routing is transparent to the application layer at the source node 130, and can increase throughput between the source node 130 and the destination node 140.

MPTCP can be illustrated in the network models of FIGS. 2A and 2B. FIG. 2A illustrates the OSI and TCP/IP network layer models along with some of the various logical protocols that can be used to implement the respective layers. For example, the OSI model defines an application, presentation, session, transport, network, data link and physical network layers. The application layer provides high-level APIs, including resource sharing, remote file access, directory services, etc. The presentation layer provides translation of data between a networking service and an application, including such functions as character encoding, data compression and encryption/decryption. The session layer manages communication sessions between two end nodes.

The transport layer provides reliable transmission of data segments between points on a network, including data segmentation, packet acknowledgement and multiplexing. The network layer provides for addressing, routing and traffic control of data packets that are formed from segments provided by the transport layer. The data link layer provides reliable transmission of data frames built from packets provided by the network layer between two nodes connected by a physical layer. Finally, the physical layer provides for transmission and reception of raw bit streams over a physical medium.

The TCP/IP model is primarily concerned with the transport and network layers of the OSI model. Thus, in the TCP/IP model, the application, presentation and session layers of the OSI model are treated as a single application layer, while the data link and physical layers are treated as a single network access layer.

Transport layer protocols typically include transmission control protocol (TCP) and user datagram protocol (UDP). The network layer is typically implemented using internet protocol (IP). These protocols can operate over a number of different physical protocols, including wired communication protocols, such as Ethernet, Token Ring, Frame Relay, SONET, and ATM, as well as wireless communication protocols, such as WiFi, CDMA, and LTE.

Referring to FIG. 2B, in an MPTCP implementation, the TCP layer is implemented with an MPTCP layer that utilizes multiple TCP subflows. Each TCP subflow communicates using a different IP connection, which may utilize a different physical layer. For example, one TCP subflow may utilize a Wifi physical layer, while another TCP subflow may utilize an LTE physical layer. From the standpoint of the application layer, however, there appears to be only a single TCP connection.

SUMMARY

Embodiments of the inventive concepts provide nodes, systems and methods that increase throughput between network nodes in a communication system by enabling the use of MPTCP protocols when the nodes are connected by multiple data link layer connections that serve a single network layer connection.

Some embodiments provide methods of implementing multipath TCP (MPTCP) on a first node. The methods include, at a data link layer of the first node, establishing first and second data link layer connections to a remote node, at the data link layer, notifying a transport layer of the first node of the establishment of the first and second data link layer connections, at the transport layer, and establishing first and second transport layer connections with the remote node, at the data link layer. The methods further include receiving a packet from the transport layer for transmission to the remote node, inspecting the packet to determine if MPTCP is enabled for the packet, and assigning the packet to the first data link layer connection or the second data link layer connection in response to determining that MPTCP is enabled for the packet.

The methods may further include notifying a network layer of the establishment of the first and second data link layer connections, wherein the network layer notifies the transport layer of the establishment of the first and second data link layer connections.

The methods may further include receiving, at the data link layer of the first node, an indication from the remote node that carrier aggregation is supported by the remote node, establishing multiple carrier connections to the remote node, notifying the network layer that multiple data link connections are available, and notifying the transport layer that MPTCP is available for use in response to receiving notification that multiple data link connections are available.

The methods may further include receiving a packet at the data link layer of the first node from the network layer of the first node, inspecting, at the data link layer, the packet received from the network layer, and assigning, at the data link layer, packets from the first transport layer connection to the first data link layer connection based on an affinity between the first transport layer connection and the first data link layer.

The first data link layer connection may include a single carrier out of multiple available carriers.

The data link layer may use carrier aggregation or dual connectivity to establish the first and second data link layer connections.

The first and second network layer connections may carry downlink subflows from the first node to the remote node.

The methods may further include signaling, in packets transferred in the first and second network layer connections from the network layer to the data link layer, the availability of MPTCP functionality, at the data link layer, inspecting the packets to determine the availability of MPTCP functionality, and at the data link layer, mapping the first and second network layer connections to the respective first and second data link layer connections.

A network node according to some embodiments includes a network interface, a processor, and a memory comprising a plurality of functional modules. The plurality of functional modules implement a data link layer, a network layer and a transport layer of a communications protocol stack, and the plurality functional modules are configured to establish first and second data link layer connections to a remote node, notify the transport layer of the establishment of the first and second data link layer connections, and establish first and second transport layer connections with the remote node over the first and second data link layer connections.

The functional modules may further be configured to receive a packet at the data link layer for transmission to the remote node, to inspect the packet to determine if MPTCP is enabled for the packet, and to assign the packet to the first data link layer connection or the second data link layer connection in response to determining that MPTCP is enabled for the packet.

The functional modules may further be configured to notify a network layer of the establishment of the first and second data link layer connections, wherein the network layer notifies the transport layer of the establishment of the first and second data link layer connections.

The functional modules may further be configured to receive, at the data link layer, an indication from the remote node that carrier aggregation is supported by the remote node, establish multiple carrier connections to the remote node, notify the network layer that multiple data link connections are available, and notify the transport layer that MPTCP is available for use in response to receiving notification that multiple data link connections are available.

The functional modules may further be configured to receive a packet at the data link layer from the network layer, inspect, at the data link layer, the packet received from the network layer, and assign, at the data link layer, packets from the first transport layer connection to the first data link layer connection based on an affinity between the first transport layer connection and the first data link layer.

The functional modules may further be configured to signal, in packets transferred in the first and second network layer connections from the network layer to the data link layer, the availability of MPTCP functionality, inspect the packets at the data link layer to determine the availability of MPTCP functionality, and at the data link layer, to map the first and second network layer connections to the respective first and second data link layer connections.

A radio access network according to some embodiments includes a base station, and a serving gateway coupled to the base station. The base station is configured to establish a plurality of data link layer connections with a user equipment node, and to establish a plurality of transmission layer connections with the user equipment node over the plurality of data link layer connections.

The plurality of data link layer connections may include first and second carriers assigned to the user equipment node for communications between the base station and the user equipment node.

The base station may be an anchor base station, and the radio access network may further include an assisting base station. The plurality of data link layer connections may include a first carrier assigned to the user equipment node for communications between the anchor base station and the user equipment node and a second carrier assigned to the user equipment node for communications between the assisting base station and the user equipment node.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
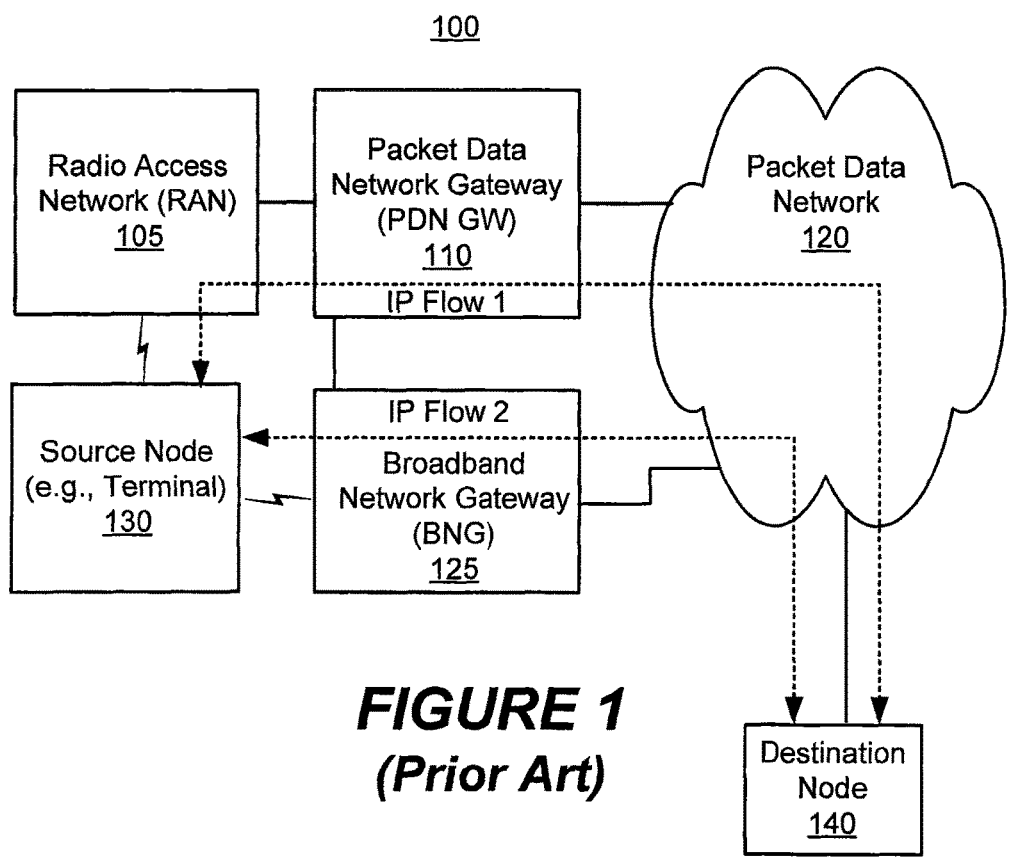
FIG. 1 illustrates a conventional network system that can support Multipath Transmission Control Protocol (MPTCP)
Figure 2A:
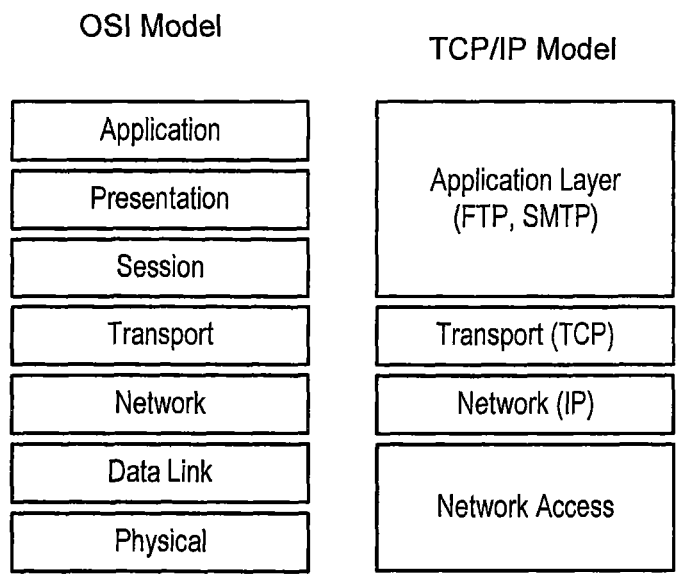
FIG. 2A illustrates OSI and TCP/IP layer models.
Figure 2B:
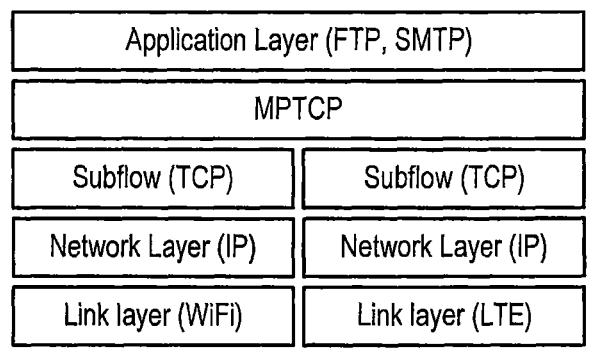
FIG. 2B illustrates a TCP/IP layer model in which MPTCP is implemented.

The invention will now be described more fully hereinafter with reference to the accompanying drawings, in which embodiments of the invention are shown. This invention may, however, be embodied in many different forms and should not be construed as limited to the embodiments set forth herein.

It will be understood that it would be unduly repetitious and obfuscating to literally describe and illustrate every combination and subcombination of these embodiments. However, it is intended that all embodiments disclosed herein can be implemented separately or combined in any way and/or combination. Accordingly, the present specification, including the drawings, shall be construed to constitute a complete written description of various exemplary combinations and subcombinations of embodiments and of the manner and process of making and using them, and shall support claims to any such combination or subcombination.

Radio Access Network Systems

For purposes of illustration and explanation only, embodiments of present inventive concepts are described herein in the context of operating in a Radio Access Network (RAN) that communicates over radio communication channels with mobile terminals (also referred to as wireless terminals or UEs). As used herein, a mobile terminal, wireless terminal, or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers that make up the UMTS radio access network. Thus, UTRAN is essentially a radio access network using wideband code division multiple access (WCDMA) for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from LTE is generally used in this disclosure to exemplify embodiments of the inventive concepts, this should not be seen as limiting the scope of inventive concepts to only these systems. Other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNodeB, or Evolved Node B) and wireless terminal or mobile terminal (also referred to as User Equipment node or UE) should be considered non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel.

Figure 3:
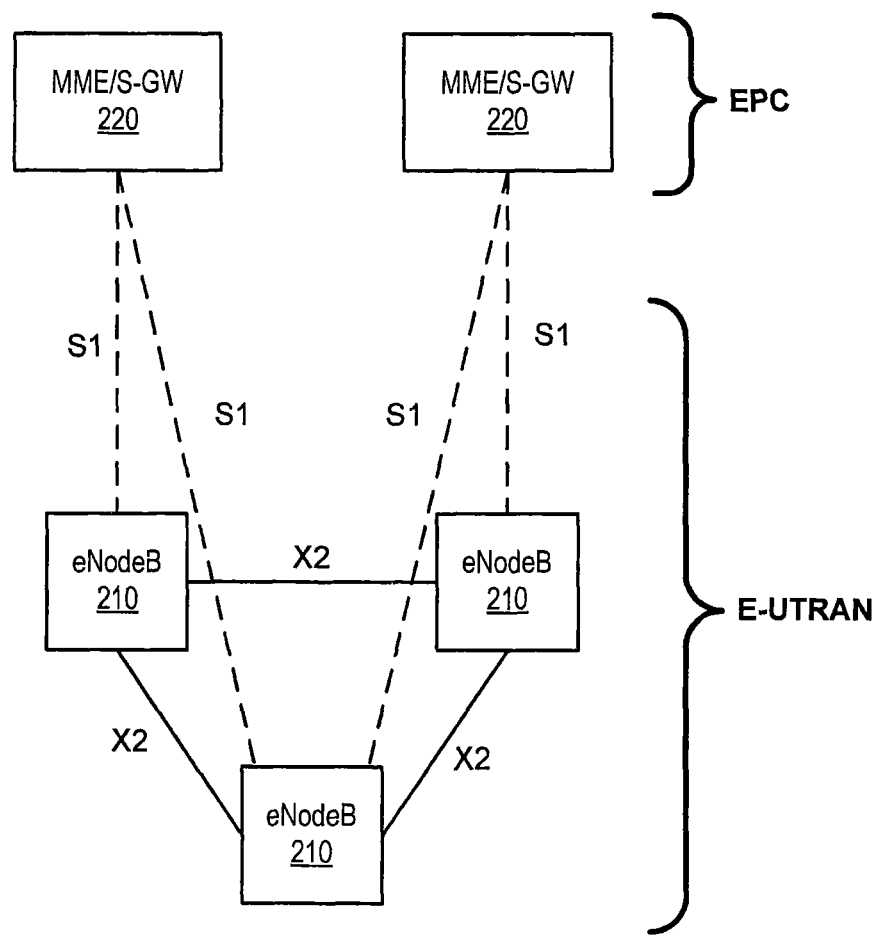
FIG. 3 illustrates a block diagram of a E-UTRA communication network.

FIG. 3 illustrates a simplified view of an exemplary Evolved UMTS Terrestrial Radio Access (E-UTRA) network including three base stations 210, called enhanced NodeBs (eNBs or eNodeBs). The eNBs 210 provide E-UTRA user plane and control plane protocol terminations towards UEs in the network (not shown in FIG. 3). The eNBs 210 are interconnected with each other using the X2 interface. The eNBs are also connected using the S1 interface to the EPC (Evolved Packet Core) represented by network nodes 220 that provide Mobility Management Entity (MME) and Serving Gateway (S-GW) functionality in the network. More specifically, the eNBs 210 are connected to the MME function by means of the S1-MME interface and to the S-GW function by means of the S1-U interface.

Still referring to FIG. 3, the eNB 210 hosts various functions, such as Radio Resource Management (RRM), radio bearer control, admission control, header compression of user plane data towards serving gateway, and/or routing of user plane data towards the serving gateway. The MME 220 is the control node that processes the signaling between the UE and the CN (core network). Significant functions of the MME 220 are related to connection management and bearer management, which are handled via Non Access Stratum (NAS) protocols. The S-GW function is the anchor point for UE mobility, and also includes other functionalities such as temporary DL (down link) data buffering while the UE is being paged, packet routing and forwarding to the right eNB, and/or gathering of information for charging and lawful interception. The PDN Gateway (P-GW, not shown in FIG. 3) is the node responsible for UE IP address allocation, as well as Quality of Service (QoS).

In describing various embodiments of the presently disclosed techniques, the non-limiting term "radio network node," "network node" or simply "node" may be used to refer any type communication device connected to a network. A network node may include a network element that serves one or more UEs and/or is connected to other network elements from which a UE receives signal. Examples of radio network nodes are eNodeBs, base stations (BS), multi-standard radio (MSR) radio nodes, network controllers, radio network controllers (RNCs), base station controllers, relays, donor nodes controlling relays, base transceiver stations (BTS), access points (AP), wireless routers, transmission points, transmission nodes, remote radio units (RRUs), remote radio heads (RRHs), nodes in a distributed antenna system (DAS), etc.

In describing some embodiments, the term user equipment (UE) is used, and refers to any type of wireless device communicating with a radio network node in a cellular or mobile communication system. Examples of UEs are target devices, device-to-device UEs, machine-type UEs or UEs capable of machine-to-machine communication, PDAs, wireless-enabled table computers, mobile terminals, smart phones, laptop embedded equipped (LEE), laptop mounted equipment (LME), USB dongles, customer premises equipment (CPE), etc. The term "mobile terminal" as used herein should be understood as being generally interchangeable with the term UE as used herein and in the various specifications promulgated by the 3GPP, but should not be understood as being limited to devices compliant to 3GPP standards.

Multipath TCP

As discussed above, Multipath TCP is an extension of TCP that enables the simultaneous use of several IP interfaces by modifying the TCP protocol so that TCP presents a regular TCP interface to applications, while in fact spreading data across several sub-flows. It does this transparently to applications and upper layers. The benefits of MPTCP include better resource utilization, better throughput and smoother reaction to link layer and IP interface failures.

One of the principles of MPTCP is that it utilizes multiple, independent network interfaces (i.e. IP connections). For example, when a device is concurrently connected to an Ethernet/IP network and a WiFi IP network—each providing a separate IP interface and IP address to the device—MPTCP allows TCP to use both network interfaces to boost throughput and provide network redundancy. IP interfaces may be added or dropped as the user moves in or out of coverage without disrupting the end-to-end TCP connection—essentially providing transport layer soft handover capabilities.

3GPP Carrier Aggregation and Dual Connectivity, on the other hand, are 3GPP standardized capabilities that enable a network to provide multiple simultaneous link layer connections to a device. Their primary use is to increase the radio bandwidth available to a device, and thereby increase the bitrate.

Carrier Aggregation

Figure 4:
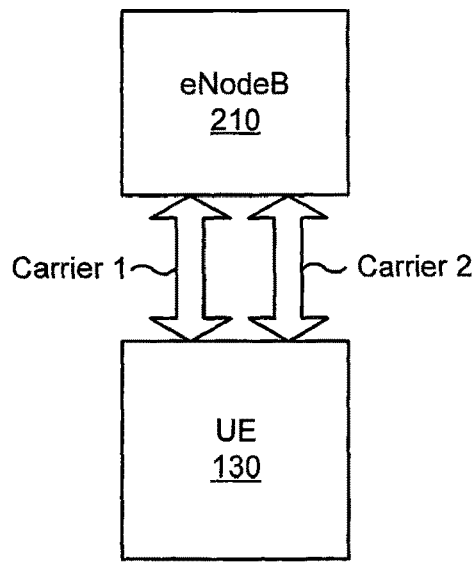
FIG. 4 is a block diagram that illustrates 3GPP Carrier Aggregation.

Carrier Aggregation is illustrated in FIG. 4. As illustrated therein, multiple carriers can be assigned by a network for use in uplink or downlink communications between a UE 130 and an eNodeB 210, which increases the bandwidth of the communication channel between the eNodeB 210 and the UE 130. Carrier Aggregation is particularly important where network operators own fragmented RF spectrum but want to aggregate the RF resources. One major benefit of 3GPP Carrier Aggregation is that the LTE Radio Resource Control (RRC) function in the eNB and UE can take advantage of differences in the carriers' radio conditions. If one of the component carriers is experiencing poorer radio conditions or higher loading, the other carrier can be used. This dynamic selection can be done quickly at high speed. Carrier Aggregation can also be extended so that the LTE RRC and MAC scheduler perform simple service specific carrier selection, e.g. put voice data over the lower frequency carrier while bursty but high bandwidth traffic such as web browsing can be placed over the higher frequency carrier. This type of service specific carrier selection however, can only be done at the 3GPP bearer (EUTRAN Radio Access Bearers (E-RAB)) level—not at a TCP flow level. Many TCP flows may be mapped to the same E-RAB.

Carrier aggregation is performed by the LTE RRC function at the data link layer, and is transparent to higher layers of the communication protocol.

Dual Connectivity

Dual connectivity allows a UE to connect to multiple eNodeBs simultaneously. This allows data to be routed simultaneously through both high powered nodes and low powered nodes in a heterogeneous network. A homogeneous network is a network in which all base stations typically have similar transmit power levels, antenna patterns, receiver noise floors, and/or backhaul connectivity to the data network. Moreover, all base stations in a homogeneous network may generally offer unrestricted access to user terminals in the network, and each base station may serve roughly a same number of user terminals.

In a heterogeneous network, low power base stations (also referred to as low power nodes (LPNs), micro nodes, pico nodes, femto nodes, relay nodes, remote radio unit nodes, RRU nodes, small cells, RRUs, etc.) may be deployed along with or as an overlay to macro base stations. A macro base station (MBS) may thus provide service over a relatively large macro cell area, and each LPN may provide service for a respective relatively small LPN cell area within the relatively large macro cell area.

Thus, a heterogeneous network features a multi-layered deployment of high-power nodes (HPNs), such as macro base stations, and low-power nodes (LPNs), such as so-called pico-base stations or pico-nodes. The LPNs and HPNs in a given region of a heterogeneous network may operate on the same frequency, in which case the deployment may be referred to as a co-channel heterogeneous deployment, or on different frequencies, in which case the deployment may be referred to as an inter-frequency or multi-carrier or multi-frequency heterogeneous deployment.

The Third Generation Partnership Project (3GPP) has proposed a set of techniques and technology referred to as "dual-layer connectivity" or simply "dual connectivity" that allows a UE to communicate simultaneously through both high powered nodes and low powered nodes in a heterogeneous network.

Figure 5:
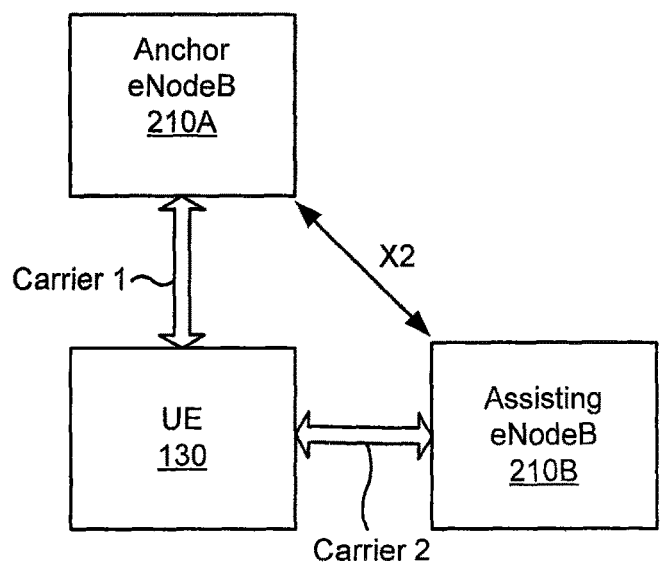
FIG. 5 is a block diagram that illustrates 3GPP Dual Connectivity.

FIG. 5 illustrates an example of a heterogeneous network in which a UE 130 uses multiple flows, e.g., an anchor flow from the macro base station (or "anchor eNB") 210A and an assisting flow from a pico base station (or an "assisting eNB") 210B. Note that terminology may vary—the anchor base station and assisting base station in a configuration like that shown in FIG. 5 may sometimes be referred to as "master" and "slave" base stations or according to other names. It should be further noted that while the terms "anchor/assisting" and "master/slave" suggest a hierarchical relationship between the base stations involved in a dual connectivity scenario, many of the principles and techniques associated with dual connectivity may be applied to deployment scenarios where there is no such hierarchical relationship, e.g., between peer base stations. Accordingly, while the terms "anchor base station" and "assisting base station" are used herein, it should be understood that the techniques and apparatus described herein are not limited to embodiments that use that terminology, nor are they necessarily limited to embodiments having a hierarchical relationship.

Data transmitted on the uplink (UL) to the anchor eNodeB 210A can be routed over the first carrier Carrier 1 or the second carrier Carrier 2. Data transmitted over the second carrier Carrier 2 to/from the assisting eNodeB 210B can be routed to/from the anchor eNodeB 210A over the X2 interface or through other network nodes.

MPTCP Over Dual Connectivity and Carrier Aggregation

MPTCP on one hand and Carrier Aggregation/Dual Connectivity on the other hand both attempt to provide similar benefits and throughput boost but operate at different levels of the communications protocol stack. MPTCP is a transport layer solution, whereas 3GPP Carrier Aggregation and Dual Connectivity are Data Link Layer solutions. Both MPTCP and Carrier Aggregation/Dual Connectivity solutions attempt to operate transparently to the upper protocol stack layers, hiding the physical network connectivity. That is, Carrier Aggregation and Dual Connectivity provide multiple physical and data link layers. The presence of multiple physical and data link layers is hidden from the network (IP) layer so that the IP layer is only aware of a single network connection. Because of this, the transport layers (e.g. TCP) are not aware that there are multiple data link layers and physical connections and so cannot utilize MPTCP.

MPTCP, while very beneficial, expects two or more network interfaces, e.g. IP interfaces and associated IP addresses. It currently is not defined to be used when there are multiple data link and physical layers but only a single IP layer. Rather, MPTCP was initially designed to work where the UE is connected to two or more different and likely independent access networks, e.g. WiFi and 3GPP LTE or WiFi and Ethernet.

The present inventive concepts are based on a realization that the benefits of MPTCP may be applicable where there were two data link layers serving a single network layer. For example, it may be beneficial to enable MPTCP when a UE device is attached to the 3GPP network alone, but through multiple RF carriers, e.g. a LTE 900 MHz 5 MHz carrier and an LTE 2300 MHz 5 MHz carrier.

Figure 6:
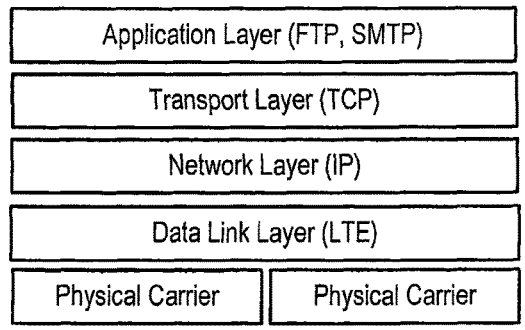
FIG. 6 illustrates a TCP/IP layer model in which MPTCP is implemented in accordance with embodiments of the inventive concepts.

A TCP/IP network model that employs MPTCP over a single physical layer is illustrated in FIG. 6. As shown therein, MPTCP may be employed in systems that have only a single transport and network layer, but multiple data link layers. By making the transport layer and network layer aware of the availability of multiple physical carriers, MPTCP may be employed even though only a single IP address is assigned to the UE.

Some embodiments allow the 3GPP RRC (data link) function in the UE to inform the IP (network layer) function in the UE that there are multiple data links available. The UE RRC connectivity is therefore no longer transparent to the UE IP layer. The UE IP layer may then inform the UE TCP layer that it may use MPTCP. The UE IP layer is therefore no longer transparent to the UE TCP layer.

Figure 7:
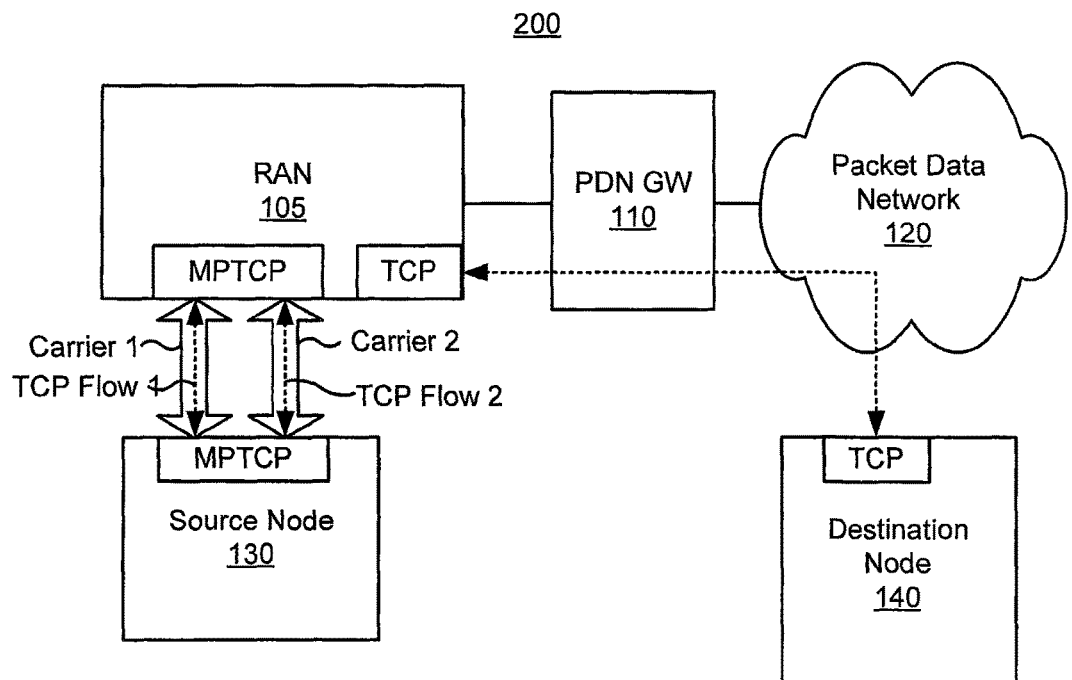
FIG. 7 is a block diagram that illustrates an implementation of MPTCP in accordance with embodiments of the inventive concepts.

FIG. 7 generally illustrates a simplified communication system 200 in which MPTCP is used over multiple carriers. In the system 200, a source node 130 (which may be a UE) that is connected to a radio access network (RAN) 105 communicates with a destination node 140 over a packet data network 120. The RAN 105 accesses the packet data network 120 through a PDN gateway 110. Using Dual Connectivity and/or Carrier Aggregation, the RAN 105 assigns multiple carriers (Carrier 1 and Carrier 2) to the source node 130. An MPTCP connection is established between the UE 130 and the RAN 105, which allows multiple TCP flows (TCP Flow 1 and TCP Flow 2) to be established between the UE 130 and the RAN 105. The RAN 105 terminates the MPTCP connection with the UE 130, and also terminates a TCP connection with the destination node 140 through the PDN gateway 110 and the packet data network 120.

Figure 8:
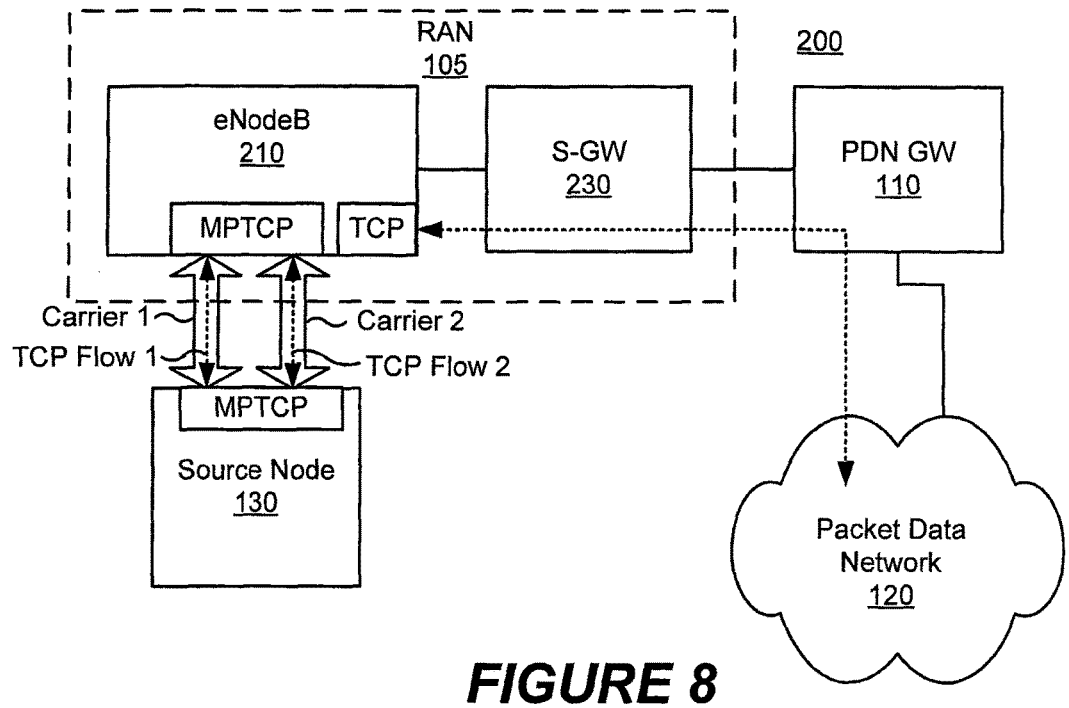
FIG. 8 is a block diagram that illustrates an implementation of MPTCP using Carrier Aggregation in accordance with embodiments of the inventive concepts.

FIG. 8 illustrates an embodiment of a communication system 200 in which the source node 130 connects to an eNodeB 210 using carrier aggregation. For Carrier Aggregation, the eNodeB 210 activates an additional component carrier for the UE (i.e. secondary carrier) according to the 3GPP specifications. However, only one IP interface will be instantiated for the UE. In the embodiments of FIG. 8, the eNodeB 210 includes an MPTCP function for downlink (DL) packets. Note that MPTCP can be used for uplink (UL) packets, although it is more commonly used for DL packets. The eNodeB 210 terminates DL TCP flows and initiates MPTCP sub-flows towards the source node 130 acting as an MPTCP end point. A packet data convergence protocol (PDCP) function in the eNodeB 210 determines which MPTCP sub-flows (and thus which data link) to send DL TCP packets over towards the source node 130.

Alternatively, the S-GW node 230 may include a MPTCP end point function for DL flows. That is, in some embodiments, the S-GW 230 may terminate downlink TCP flows and initiate MPTCP sub-flows (TCP Flow 1, TCP Flow 2) acting as an MPTCP end point for the source node 130.

Figure 9:
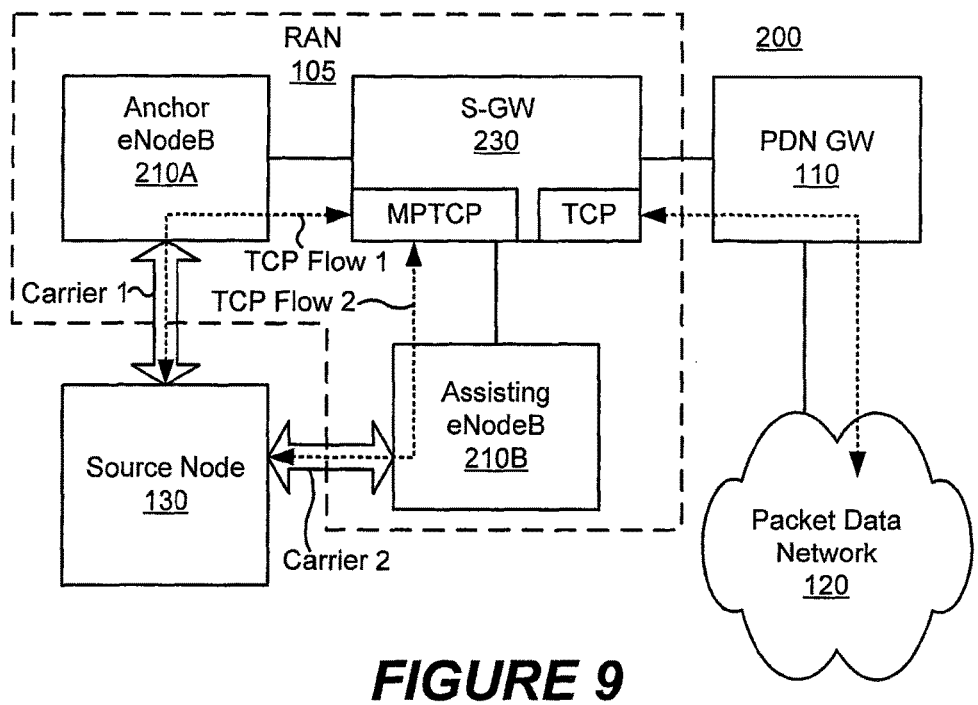
FIG. 9 is a block diagram that illustrates an implementation of MPTCP using Dual Connectivity in accordance with embodiments of the inventive concepts.

FIG. 9 illustrates an embodiment of a communication system 200 in which the source node 130 connects to the RAN 105 using Dual Connectivity. The source node 130 establishes a first connection using Carrier 1 with an anchor eNodeB 210A. A second connection is established from the source node 130 to an assisting eNodeB 210B using Carrier 2.

At this point, the 3GPP RRC (data link) function in the source node 130 informs the IP (network layer) function in the source node 130 that there are multiple data links available, so that MPTCP can be used.

In the embodiments of FIG. 9, the S-GW 230 includes an MPTCP function for downlink (DL) packets. The S-GW 230 terminates downlink TCP flows and initiates MPTCP sub-flows (TCP Flow 1, TCP Flow 2) towards the source node 130 acting as an MPTCP end point for the source node 130. The S-GW 230 determines which MPTCP sub-flows (and thus which data link) to send downlink TCP packets over towards the source node 130.

Alternatively, anchor eNodeB 210A may terminate downlink TCP flows and initiate MPTCP sub-flows. In that case, data transmitted over the IP subflow 2 that is mapped to Carrier 2 may be transmitted from the anchor eNodeB 210A to the assisting eNodeB 210B for transmission to the source node 130 over Carrier 2.

It will be appreciated that in some embodiments, an eNodeB may implement S-GW functionality. Accordingly, although the eNodeBs 210, 210A, 210B are illustrated as separate entities from the S-GW 230, the S-GW 230 could be implemented in any of the eNodeBs 210, 210A, 210B.

Figure 10:
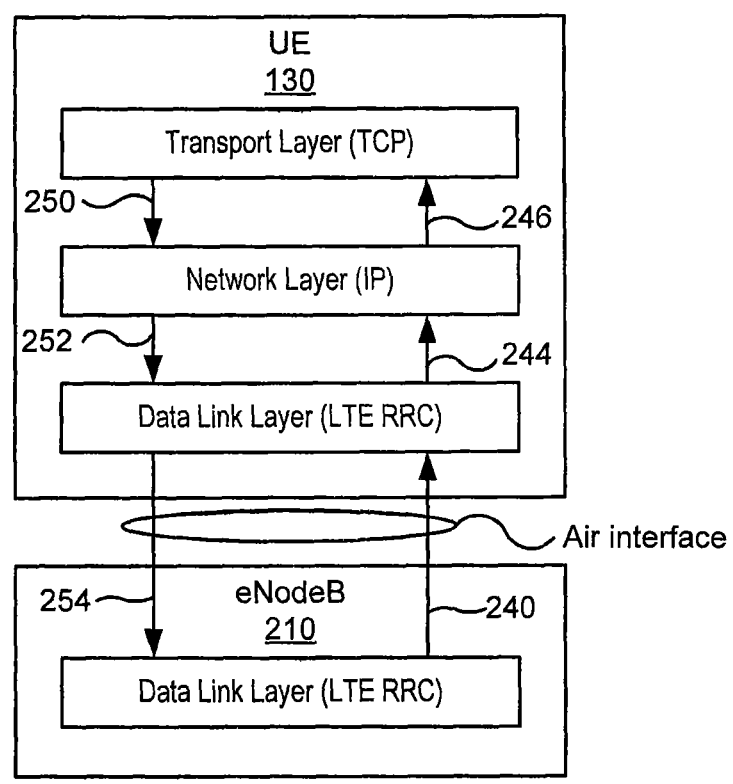
FIGS. 10 and 11 are TCP/IP layer models that illustrate implementation of MPTCP in accordance with embodiments of the inventive concepts.

FIG. 10 illustrates operations according to some embodiments in which MPTCP over multiple carriers is initiated by a UE. Referring to FIG. 10, the RRC function of an eNodeB 210 signals over the air interface to a UE 130 that carrier aggregation is active (arrow 240). The UE RRC then informs the network layer via a new or extended API that there are two or more datalink layers available for the network interface (i.e., for a single IP address) (arrow 244). The UE network layer (i.e., the IP layer) then informs the transport layer via a new or extended API that the transport layer can use MPTCP (arrow 246).

Because the UE transport layer is aware that MPTCP is available, the UE transport layer sends a TCP SYN packet with MPTCP options included to the network layer (arrow 250). The UE network layer encapsulates and forwards the TCP SYN packet and sends it to the LTE RRC layer (arrow 252). The IP stack allows MPTCP options in packets in which there is only one source or destination address.

The RRC function of the UE 130 (or the function immediately below the UE's network layer) looks for MPTCP options in the packet. If MPTCP options are found, the RRC function remembers the sub-flows and can map them to specific carriers to be sent to the eNodeB 210 (arrow 254).

The RRC functions of the eNodeB 210 and the UE 130 (or PDCP function of the eNodeB before encryption) inspect transport packet headers for MPTCP options. If MPTCP is detected, the packets of the same MPTCP sub-flows may be assigned an affinity to a specific carrier. In this way, packets belonging to the same sub-flow may be sent over the same carrier when possible. Alternatively, packets may be assigned to available carriers based on load balancing, channel quality indicator (CQI), delay, quality of service (QoS) or other bases.

Figure 11:
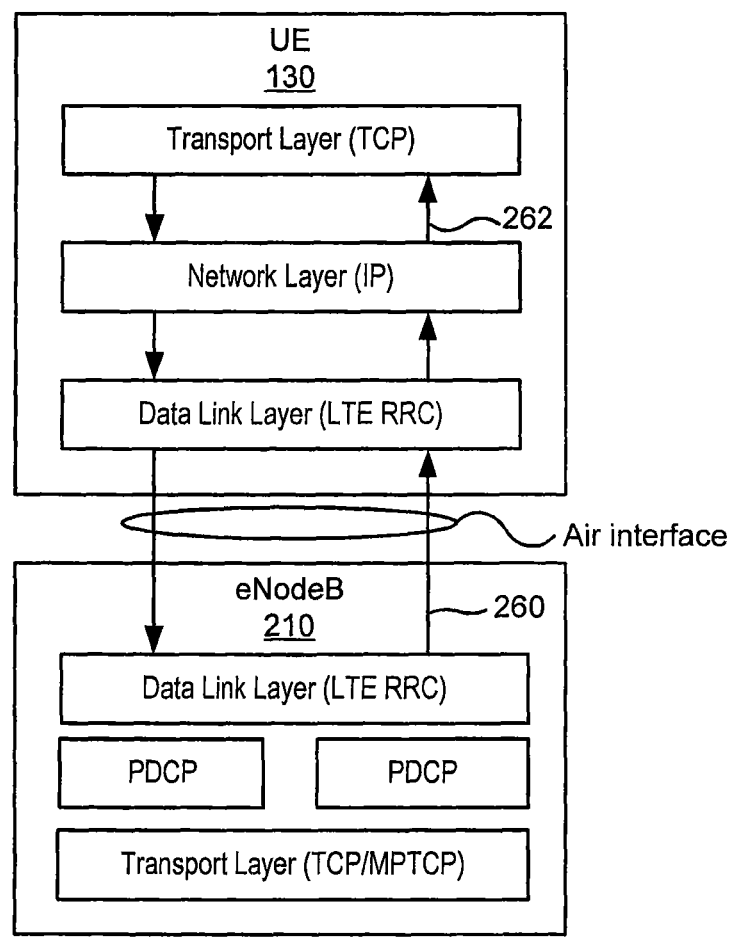

FIG. 11 illustrates an example of processing downlink packets by an eNodeB 210. When the eNodeB 210 receives a downlink packet at the transport layer, if the eNodeB 210 is the MPTCP endpoint (as in the embodiments of FIG. 8) the eNodeB 210 replaces the TCP header with an MPTCP header for UEs that are MPTCP enabled. If the eNodeB 210 is not the MPTCP endpoint (as in the embodiments of FIG. 9), then the eNodeB 210 TCP function passes the packet to the next lower layer for processing.

The eNodeB 210 determines which LTE carrier in the link layer should carry the packet (arrow 260). This determination is based on MPTCP sub-flow contexts so that packets belonging to the same sub-flow are preferentially sent over the same carrier. However, packets may be assigned to available carriers based on load balancing, channel quality indicator (CQI), delay, quality of service (QoS) or other bases.

The RRC function (or function immediately below the network layer) of the UE 130 looks for MPTCP options and passes the packet sub-flow up to the TCP layer, where it is processed as usual (arrow 262).

As illustrated above, the 3GPP network functions (e.g. eNB, S-GW) control how and when MPTCP is used between a UE and application servers on the internet.

Enabling MPTCP over separate LTE carriers (e.g. with Carrier Aggregation or Dual Connectivity) offers the performance advantages of MPTCP while using a single IP interface.

LTE is expanding into new spectrum traditionally reserved for low power indoor radio technologies such as WiFi. Some embodiments enable MPTCP to operate over separate carriers on separate bands, e.g. one carrier in the operator's licensed spectrum and an additional carrier in the unlicensed, shared band. The operator can determine what subflows are sent over which component carrier. This decision can be based on a wide variety of inputs, including: packet QoS, relative or absolute cost of transmitting the packets over on carrier versus another, radio conditions and packet loss or delay characteristics of the component carriers.

As noted above, in some embodiments of the inventive concepts, the UE RRC connectivity is no longer transparent to the UE IP layer. The UE IP interface protocol is aware that there multiple, separate link layers. The UE IP layer may then inform the UE TCP layer that it may use MPTCP. Thus, the UE IP layer is no longer transparent to the UE TCP layer.

Figure 12:
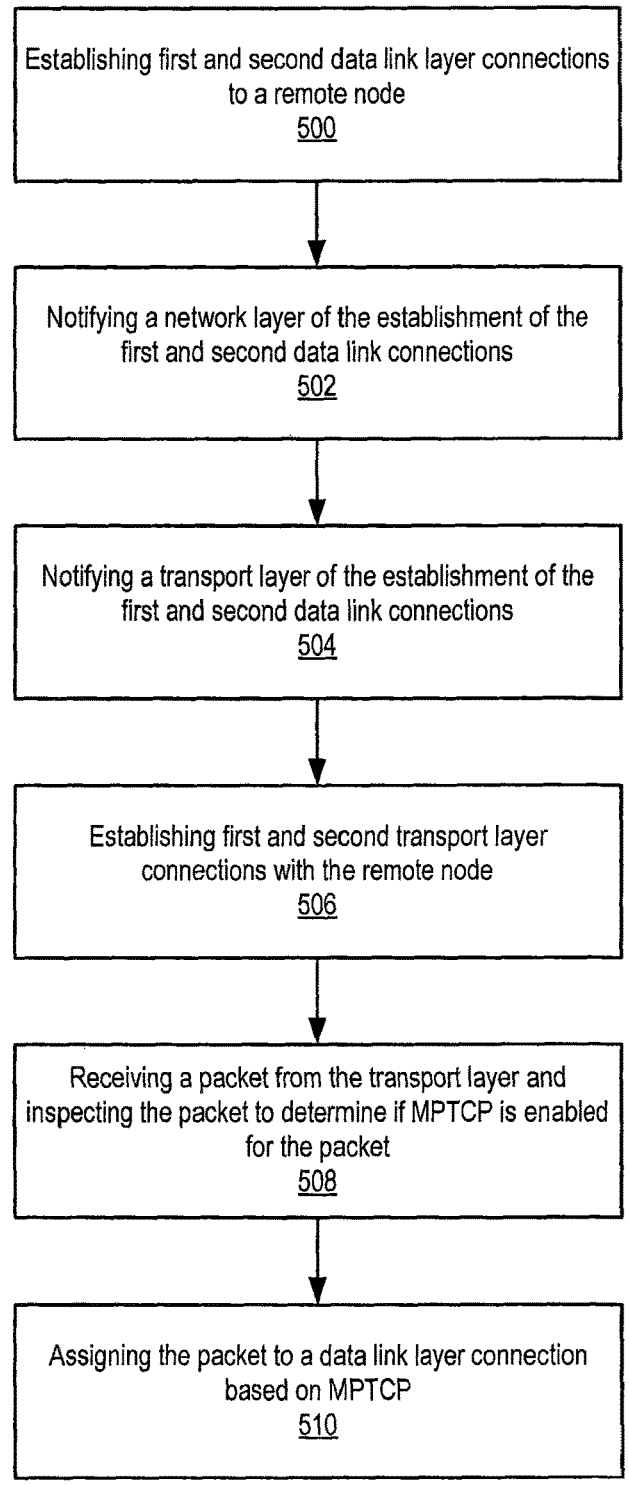
FIGS. 12, 13 and 14 illustrate a diagram of operations and associated message flows that may be performed by various elements in 7-9 to implement MPTCP in accordance with some embodiments of the inventive concepts.
Figure 13:
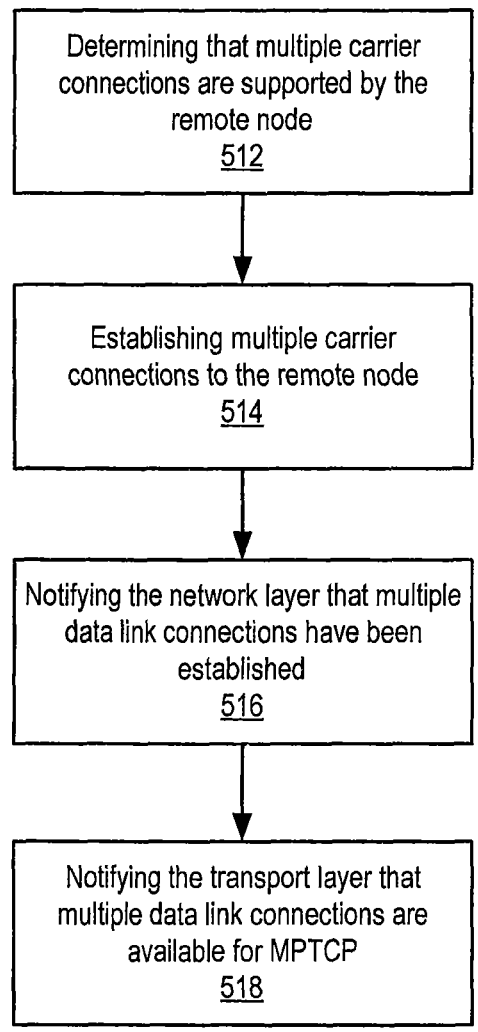
Figure 14:
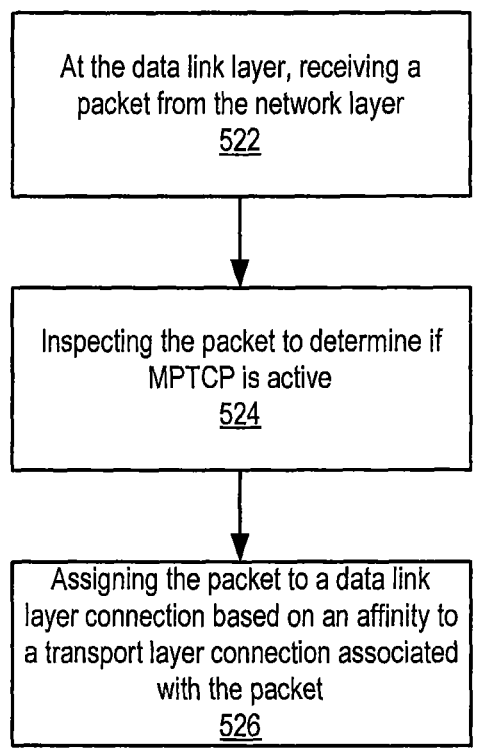

FIGS. 12-14 illustrate operations of systems/methods according to some embodiments. Referring to FIG. 12, operations for implementing multipath TCP (MPTCP) on a network node according to some embodiments include establishing first and second data link layer connections to a remote node (block 500). The first and second data link layer connections are established by the data link layer of the network node. After the first and second data link layer connections are established, the data link layer notifies a network layer of the first node of the establishment of the first and second data link layer connections (block 502). The network layer notifies a transport layer of the first node of the establishment of the first and second data link layer connections so that the transport layer is aware that MPTCP may be used even though only a single network layer is present (block 504). The method then includes establishing first and second transport layer connections with the remote node (block 506). A packet is received at the data link layer from the transport layer for transmission to the remote node (block 508). The data link layer inspects the packet to determine if MPTCP is enabled for the packet, and assigns the packet to the first data link layer connection or the second data link layer connection in response to determining that MPTCP is enabled for the packet (block 510).

Referring to FIG. 13, operations according to some embodiments include determining that multiple carrier connections are supported by a remote node, such as a UE or eNodeB (block 512), establishing multiple carrier connections to the remote node (block 514), notifying the network layer that multiple data link connections have been established (block 516), and notifying the transport layer that MPTCP is available for use in response to receiving notification that multiple data link connections have been established (block 518).

Referring to FIG. 14, operations according to some embodiments include receiving a packet at the data link layer from the network layer (block 522). The data link layer inspects the packet received from the network layer to determine if MPTCP is active (block 524), and, if MPTCP is active, assigns packets from the first transport layer connection to the first data link layer connection based on an affinity between the first transport layer connection and the first data link layer (block 526). In this context, an "affinity" is simply a preference for one link over the other, but not a fixed choice or exclusive association. Rather, one link may be given more weighting in a probabilistic choice.

Figure 15:
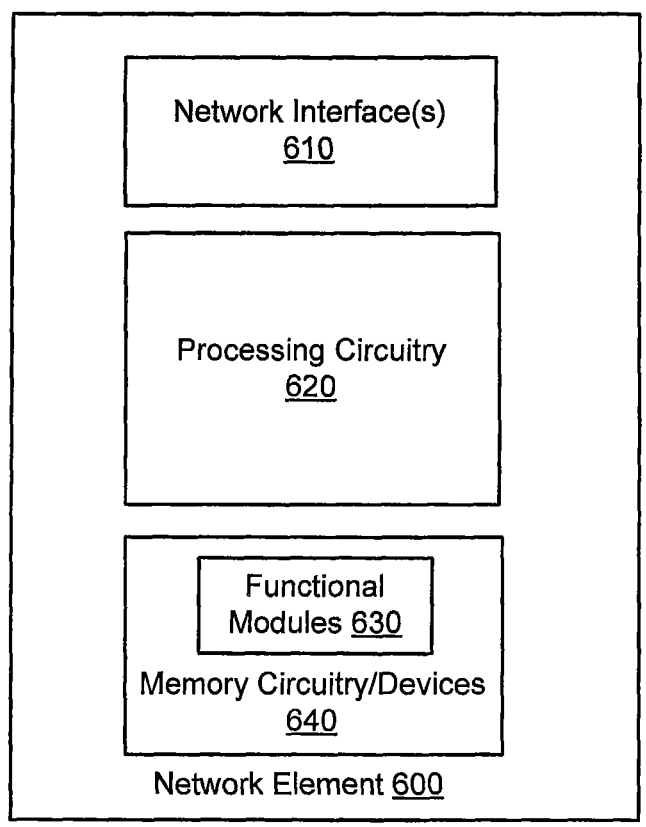
FIGS. 15 and 16 are block diagrams that illustrate a network element that is configured in accordance with some embodiments of the present invention.

Example Network Element Architecture:

FIG. 15 illustrates a block diagram of a network element 600 that is configured in accordance with some embodiments of the present invention. The network element 600 may be used in the source node 130, the destination node 140, the PDN GW 110, and/or the S-GW 230 and configured to carry-out at least some of the respective functionality described herein. Referring to FIG. 15, the network element 600 can include one or more network interfaces 610, processing circuitry 620, and memory circuitry/devices 640 that contain functional modules 630.

The processing circuitry 620 may include one or more data processing circuits, such as a general purpose and/or special purpose processor (e.g., microprocessor and/or digital signal processor). The processing circuitry 620 is configured to execute computer program instructions from the functional modules 630 in the memory circuitry/devices 640, described below as a computer readable medium, to perform some or all of the operations and methods that are described above for one or more of the embodiments. Accordingly, the processing circuitry 620 can be configured by execution of the computer program instructions in the functional modules 630 to carry out at least some of the functionality described herein to setup MPTCP connections and route packets over multiple data link layer connections.

Figure 16:
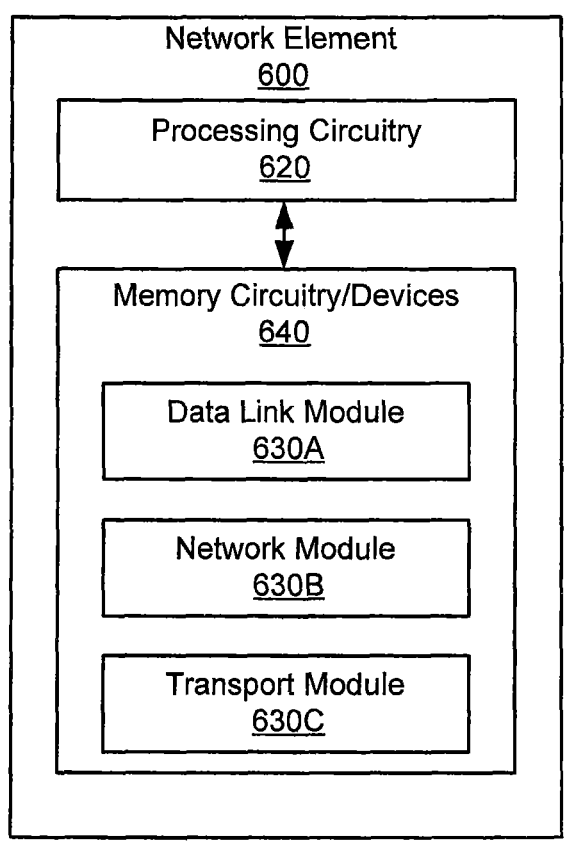

Embodiments of network elements configured according to some embodiments are illustrated in more detail in FIG. 16. Referring to FIG. 16, a network element 600 may include a data link module 630A that performs operations associated with the data link layer in the network element 600, a network module 630B that performs operations associated with the network layer in the network element 600, and a transport module 630C that performs operations associated with the transport layer in the network element 600.

For example, the data link module 630A may perform operations such as establishing first and second data link layer connections to a remote node (FIG. 12, block 500), notifying the network layer of the establishment of the first and second data link layer connections (FIG. 12, block 502), receiving a packet from the transport layer for transmission to the remote node (FIG. 12, block 508), inspecting the packet to determine if MPTCP is enabled for the packet (FIG. 12, block 508), and assigning the packet to the first data link layer connection or the second data link layer connection in response to determining that MPTCP is enabled for the packet (FIG. 12, block 510).

The data link module 630A may further perform operations such as determining that multiple carrier connections are supported by a remote node, such as a UE or eNodeB (FIG. 13, block 512), establishing multiple carrier connections to the remote node (FIG. 13, block 514), and notifying the network layer that multiple data link connections have been established (FIG. 13, block 516).

The data link module 630A may further perform operations such as receiving a packet from the network layer (FIG. 14, block 522), inspecting the packet received from the network layer to determine if MPTCP is active (FIG. 14, block 524), and, if MPTCP is active, assigning the packet to the first data link layer connection based on an affinity between the first transport layer connection and the first data link layer connection (FIG. 14, block 526).

The network module 630B may perform operations such as notifying the transport module 630C of the establishment of the first and second data link layer connections so that the transport layer is aware that MPTCP may be used even though only a single network layer is present (FIG. 12, block 504), and notifying the transport layer that MPTCP is available for use in response to receiving notification that multiple data link connections have been established (FIG. 13, block 518).

The transport module 630C may perform operations such as establishing first and second transport layer connections with the remote node in response to being notified multiple data link connections have been established (FIG. 12, block 506).

In the above explanation of exemplary embodiments of the invention, it is to be understood that, when a element is referred to as being "connected", "coupled", "responsive", or variants thereof to another element, it can be directly connected, coupled, or responsive to the other element or intervening elements may be present. In contrast, when an element is referred to as being "directly connected". "directly coupled", "directly responsive", or variants thereof to another element, there are no intervening elements present. In the description and appending drawings, like numbers refer to like elements throughout. Furthermore, "coupled", "connected", "responsive", or variants thereof as used herein may include wirelessly coupled, connected, or responsive. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present invention. All such variations and modifications are intended to be included herein within the scope of the present invention, as set forth in the following claims.

What is claimed is:

1. A method of implementing multipath TCP (MPTCP) on a first node, comprising:
   at a data link layer of the first node, establishing first and second data link layer connections to a remote node;
   at the data link layer, notifying a transport layer of the first node of the establishment of the first and second data link layer connections;
   at the transport layer, establishing first and second transport layer connections with the remote node over the first and second data link layer connections, respectively;
   signaling, in packets transferred in first and second network layer connections from a network layer to the data link layer, the availability of MPTCP functionality; and
   at the data link layer, mapping the first and second network layer connections to the respective first and second data link layer connections.

2. The method of claim 1, further comprising notifying a network layer of the establishment of the first and second data link layer connections, wherein the network layer notifies the transport layer of the establishment of the first and second data link layer connections.

3. The method of claim 2, further comprising:
   receiving, at the data link layer of the first node, an indication from the remote node that carrier aggregation is supported by the remote node;
   establishing multiple carrier connections to the remote node;
   notifying the network layer that multiple data link connections are available; and
   notifying the transport layer that MPTCP is available for use in response to receiving notification that multiple data link connections are available.

4. The method of claim 1, further comprising:
   receiving a packet at the data link layer of the first node from the network layer of the first node;
   inspecting, at the data link layer, the packet received from the network layer; and
   assigning, at the data link layer, the received packet to one of the first the first data link layer connection and the second data link layer connection based on an affinity between an MPTCP sub-flow associated with the packet and the one of the first data link layer connection and the second data link layer connection.

5. The method of claim 4, wherein the first data link layer connection comprises a single carrier out of multiple available carriers.

6. The method of claim 1, wherein the data link layer uses carrier aggregation or dual connectivity to establish the first and second data link layer connections.

7. The method of claim 1, wherein the first and second network layer connections carry downlink subflows from the first node to the remote node.

8. A network node, comprising:
a network interface;
a processor; and
a memory comprising a plurality of functional modules;
wherein the plurality of functional modules implement a data link layer, a network layer and a transport layer of a communications protocol stack; and
wherein the plurality functional modules are configured to establish first and second data link layer connections to a remote node, notify the transport layer of the establishment of the first and second data link layer connections, and establish first and second transport layer connections with the remote node over the first and second data link layer connections, respectively;
wherein the functional modules are further configured to:
signal, in packets transferred in first and second network layer connections from a network layer to the data link layer, the availability of MPTCP functionality; and
at the data link layer, to map the first and second network layer connections to the respective first and second data link layer connections.

9. The network node of claim 8, wherein the functional modules are further configured to receive a packet at the data link layer for transmission to the remote node, to inspect the packet to determine if MPTCP is enabled for the packet, and, in response to determining that MPTCP is enabled for the packet, to assign the packet to the first data link layer connection or the second data link layer connection based on an affinity between an MPTCP sub-flow associated with the packet and the one of the first data link layer connection and the second data link layer connection.

10. The network node of claim 8, wherein the functional modules are further configured to notify a network layer of the establishment of the first and second data link layer connections, wherein the network layer notifies the transport layer of the establishment of the first and second data link layer connections.

11. The network node of claim 10, wherein the functional modules are further configured to:
receive, at the data link layer, an indication from the remote node that carrier aggregation is supported by the remote node;
establish multiple carrier connections to the remote node;
notify the network layer that multiple data link connections are available; and
notify the transport layer that MPTCP is available for use in response to receiving notification that multiple data link connections are available.

12. The network node of claim 8, wherein the first data link layer connection comprises a single carrier out of multiple available carriers.

13. The network node of claim 8, wherein the data link layer uses carrier aggregation or dual connectivity to establish the first and second data link layer connections.

14. The network node of claim 8, wherein the first and second network layer connections carry downlink subflows from the network node to the remote node.

* * * * *